United States Patent
Yang et al.

(10) Patent No.: US 9,307,437 B2
(45) Date of Patent: Apr. 5, 2016

(54) METHOD FOR MEASURING CELL IN WIRELESS ACCESS SYSTEM, AND DEVICE THEREFOR

(75) Inventors: Yoonoh Yang, Anyang-si (KR); Suhwan Lim, Anyang-si (KR); Manyoung Jung, Anyang-si (KR); Sangwook Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 14/342,628

(22) PCT Filed: Sep. 10, 2012

(86) PCT No.: PCT/KR2012/007259
§ 371 (c)(1),
(2), (4) Date: Mar. 4, 2014

(87) PCT Pub. No.: WO2013/036084
PCT Pub. Date: Mar. 14, 2013

(65) Prior Publication Data
US 2014/0219131 A1  Aug. 7, 2014

Related U.S. Application Data

(60) Provisional application No. 61/532,103, filed on Sep. 8, 2011.

(51) Int. Cl.
*H04W 24/10* (2009.01)
*H04W 56/00* (2009.01)
(Continued)

(52) U.S. Cl.
CPC .............. *H04W 24/10* (2013.01); *H04W 48/20* (2013.01); *H04W 56/00* (2013.01); *H04W 48/16* (2013.01)

(58) Field of Classification Search
CPC ............................... H04W 24/10; H04W 56/00
See application file for complete search history.

(56) References Cited

U.S. PATENT DOCUMENTS

2011/0151919 A1    6/2011  Shin
2011/0286346 A1*  11/2011  Barbieri et al. ............... 370/252
(Continued)

FOREIGN PATENT DOCUMENTS

KR    10-2011-0070479 A    6/2011

OTHER PUBLICATIONS

3GPP TS 36.214, V10.1.0 (Mar. 2011), Technical Specification, 3rd Generation Partnership Project; Technical Specification Group Radio Access Network; Evolved Universal Terrestrial Radio Access (E-UTRA); Physical Layer; Measurements (Release 10), Mar. 2011, 13 pages.

(Continued)

*Primary Examiner* — Mohammad Anwar
(74) *Attorney, Agent, or Firm* — Birch, Stewart, Kolasch & Birch, LLP

(57) ABSTRACT

Disclosed are a method for measuring a cell in a wireless access system and a device therefor. Specifically, the method comprises the steps of: receiving a pattern for reference signal received power (RSRP)/reference signal received quality (RSRQ) measurement; measuring a received signal strength indicator (RSSI) from a plurality of subframes included in the pattern for the RSRP/RSRQ measurement; extracting almost blank subframes (ABSs) from the plurality of subframes included in the pattern for the RSRP/RSRQ measurement by using the measured RSSI; and measuring the RSRP/RSRQ from the plurality of subframes included in the pattern for the RSRP/RSRQ measurement in consideration of the extracted ABSs.

16 Claims, 12 Drawing Sheets

(51) Int. Cl.
*H04W 48/20* (2009.01)
*H04W 48/16* (2009.01)

(56) References Cited

U.S. PATENT DOCUMENTS

2012/0082047 A1* 4/2012 Wu .............................. 370/252
2014/0192671 A1* 7/2014 Lim et al. ..................... 370/252

OTHER PUBLICATIONS

3GPP TS 36.331, V10.1.0 (Mar. 2011), Technical Specification, 3rd Generation Partnership Project; Technical Specification Group Radio Access Network; Evolved Universal Terrestrial Radio Access (E-UTRA); Radio Resource Control (RRC); Protocol Specification, Release 10, Mar. 2011, 290 pages.

LG Electronics Inc., "Resource Specific RRM," 3GPP TSG RAN WG1, Meeting #63bis, Agenda Item 6.2.6, R1-110382, Jan. 17-21, 2011, Dublin, Ireland, 2 pages.

* cited by examiner

FIG. 6
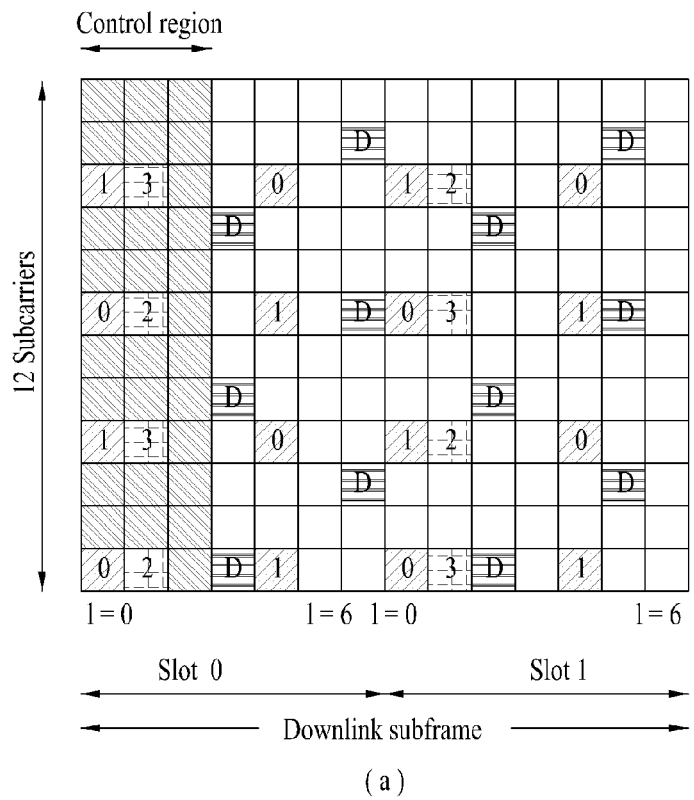
(a)
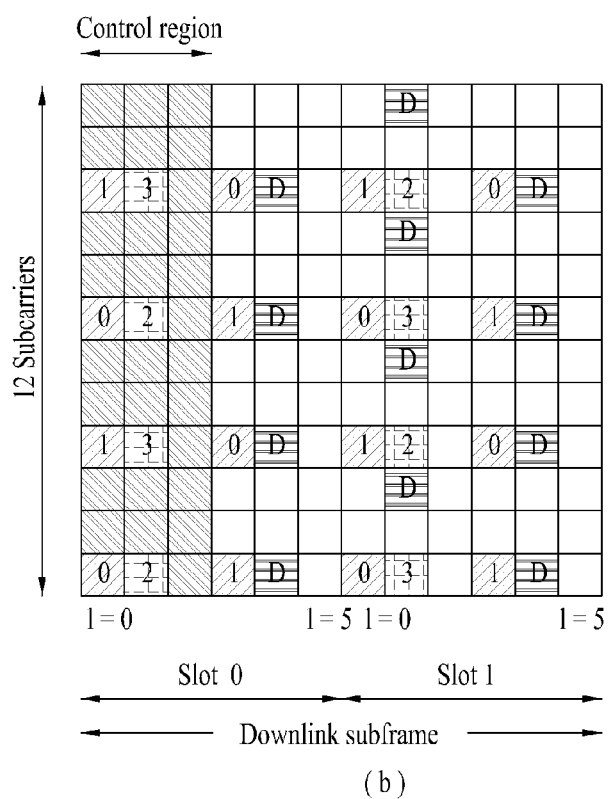
(b)

METHOD FOR MEASURING CELL IN WIRELESS ACCESS SYSTEM, AND DEVICE THEREFOR

CROSS REFERENCE TO RELATED APPLICATIONS

This application is the National Phase of PCT/KR2012/007259 filed on Sep. 10, 2012, which claims priority under 35 U.S.C. §119(e) to U.S. Provisional Application No. 61/532,103 filed on Sep. 8, 2011, all of which are hereby expressly incorporated by reference into the present application.

TECHNICAL FIELD

The present invention relates to a wireless access n system, and more particularly, to a method of measuring a cell in a heterogeneous network base station coexisting environment and apparatus for supporting the same.

BACKGROUND ART

Mobile communication system has been developed to provide an audio service by securing user's activity and mobility. The ongoing trend of the mobile communication system is to extend its service capability to a data service as well as the audio service. Currently, the development of the mobile communication system enables a high-speed data service. Yet, since a currently serviced mobile communication system causes resource shortage and fails in meeting user's request for a faster service, the demand for a further advanced mobile communication system is rising.

One of the most significant requirements for the next generation wireless access system is the capability of supporting the high data rate requisite. To this end, many on going efforts are made to research and develop various technologies including MIMO (multiple input multiple output), CoMP (cooperative multiple point transmission), relay and the like.

Moreover, in order to accommodate the skyrocketing wireless data requisite, the application of the heterogeneous network consisting of macro-pico or macro-femto cells is currently extended. In doing so, the pico cell or the femto cell is located within the macro cell. In this situation, a user equipment located on a boundary between overlapping cells faces a problem that signals transmitted from the overlapping cells mutually work as interference on each other.

DISCLOSURE OF THE INVENTION

Technical Tasks

Accordingly, the present invention is directed to a method of measuring a cell smoothly in a heterogeneous network base station coexisting environment and apparatus therefor.

One object of the present invention is to provide a method of accurately measuring RSRP/RSRQ (reference signal received power/reference signal received quality) in an eICIC (enhanced Inter-Cell Interference Coordination) applied environment and apparatus therefor.

Another object of the present invention is to provide a method of performing an accurate cell selection and apparatus therefor.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of measuring a cell in a wireless access system according to one embodiment of the present invention includes the steps of receiving a pattern for RSRP/RSRQ (reference signal received power/reference signal received quality) measurements, measuring RSSI (received signal strength indicator) in a plurality of subframes included in the pattern for the RSRP/RSRQ measurements, extracting ABS (almost blank subframe) from a plurality of the subframes included in the pattern for the RSRP/RSRQ measurements using the measured RSSI, and measuring the RSRP/RSRQ in a plurality of the subframes included in the pattern for the RSRP/RSRQ measurements in consideration of the extracted ABS.

To further achieve these and other advantages and in accordance with the purpose of the present invention, as embodied and broadly described, a user equipment, which performs a cell measurement in a wireless access system, according to another embodiment of the present invention includes an RF (radio frequency) unit configured to transceive radio signals and a processor receiving a pattern for RSRP/RSRQ (reference signal received power/reference signal received quality) measurements, the processor measuring RSSI (received signal strength indicator) in a plurality of subframes included in the pattern for the RSRP/RSRQ measurements, the processor extracting ABS (almost blank subframe) from a plurality of the subframes included in the pattern for the RSRP/RSRQ measurements using the measured RSSI, the processor measuring the RSRP/RSRQ in a plurality of the subframes included in the pattern for the RSRP/RSRQ measurements in consideration of the extracted ABS.

Preferably, if the cell for the RSRP/RSRQ measurements comprises a macro cell, the RSRP/RSRQ is measured in a plurality of the subframes included in the pattern for the RSRP/RSRQ measurements except the ABS.

Preferably, if the cell for the RSRP/RSRQ measurements comprises a pico cell, the RSRP/RSRQ is measured in the ABS only among a plurality of the subframes included in the pattern for the RSRP/RSRQ measurements.

Preferably, the subframe having a measured RSSI value smaller than that measured in the rest of the subframes from a plurality of the subframes included in the pattern for the RSRP/RSRQ measurements is extracted as the ABS.

Preferably, the subframe having a measured RSSI value smaller than a preset threshold is extracted as the ABS from a plurality of the subframes included in the pattern for the RSRP/RSRQ measurements.

Preferably, the subframe having a measured RSSI value smaller than an average value of RSSI values measured in a plurality of the subframes included in the pattern for the RSRP/RSRQ measurements is extracted as the ABS.

Preferably, pattern information for the RSRP/RSRQ measurements includes measSubframePattern-Serv or measSubframePattern-Neigh.

Preferably, pattern information for the RSRP/RSRQ measurements is sent through an RRC connection reconfiguration message.

Advantageous Effects

According to an embodiment of the present invention, in a wireless access system, and preferably, in a heterogeneous network base station coexisting environment, a cell can be smoothly measured.

According to an embodiment of the present invention, in an eICIC applied environment, ABS (almost blanked subframe) is extracted using RSSI (received signal indicator), whereby RSRP/RSRQ can be accurately measured.

According to an embodiment of the present invention, RSRP/RSRQ is accurately measured, whereby a cell selection can be accurately performed.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description, serve to explain the principles of the invention.

FIG. 6 is a diagram for one example of a reference signal pattern mapped to a downlink resource block (RB) pair defined in 3GPP LTE system.

BEST MODE

Mode for Invention

Figure 1:
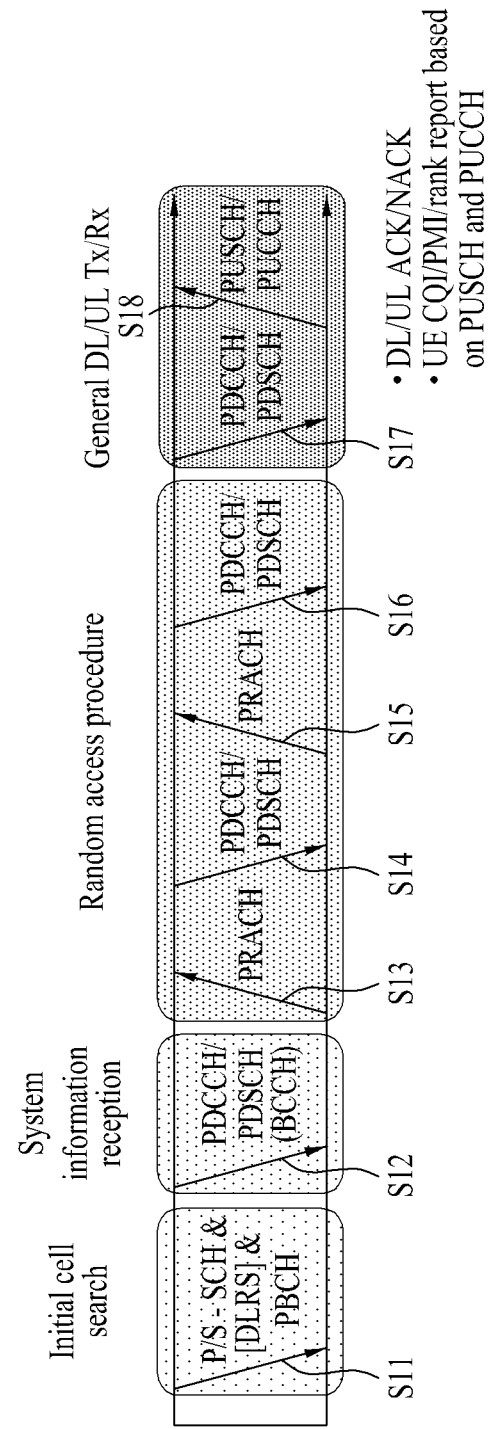
FIG. 1 is a diagram for explaining physical channels used for 3GPP system and a signal transmission using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), an AMS (Advanced Mobile Station), a WT (Wireless terminal), an MTC (Machine-Type Communication) device, an M2M (Machine-to-Machine) device, a D2D (Device-to-Device) device, and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. 3GPP LTE/LTE-A System to which the Present Invention is Applicable 1.1. The General of System FIG. 1 is a diagram for explaining physical channels used for 3GPP system and a signal transmission using the same.

If a power of a user equipment is turned on or the user equipment enters a new cell, the user equipment may perform an initial cell search job for matching synchronization with a base station and the like [S11]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S12].

Thereafter, the user equipment may be able to perform a random access procedure to complete the access to the base station [S13 to S16]. To this end, the user equipment may transmit a specific sequence as a preamble via a physical random access channel (PRACH) [S13] and may be then able to receive a response message via PDCCH and a corresponding PDSCH in response to the random access [S14]. In case of a contention based random access, it may be able to perform a contention resolution procedure such as a transmission S15 of an additional physical random access channel and a channel reception S16 of a physical downlink control channel and a corresponding physical downlink shared channel.

Having performed the above mentioned procedures, the user equipment may be able to perform a PDCCH/PDSCH reception S17 and a PUSCH/PUCCH (physical uplink shared channel/physical uplink control channel) transmission S18 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
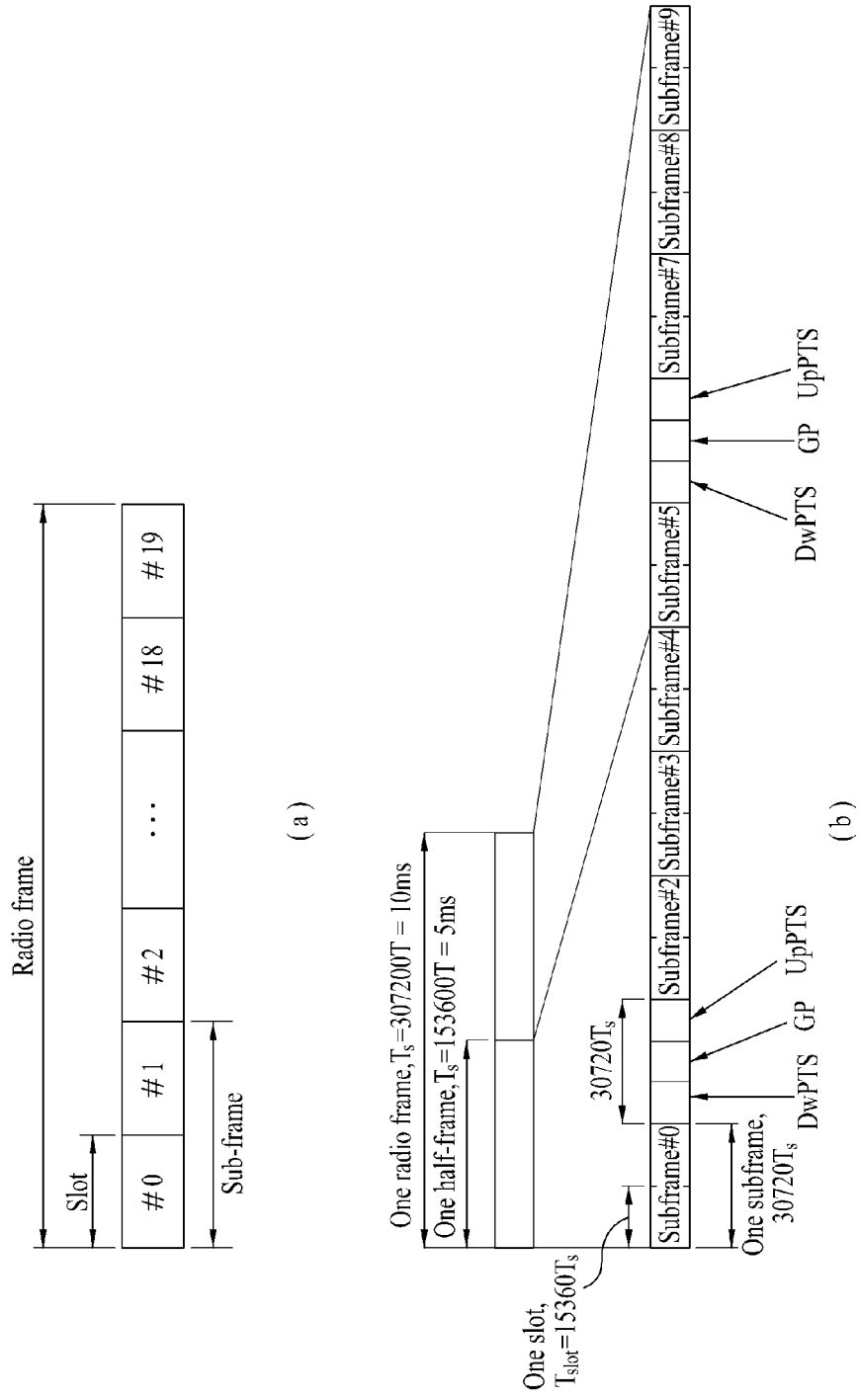
FIG. 2 is a diagram for a structure of a radio frame in 3GPP LTE.

FIG. 2 shows structures of radio frames in 3GPP LTE.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (*a*) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP system uses OFDMA in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2 (*b*) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
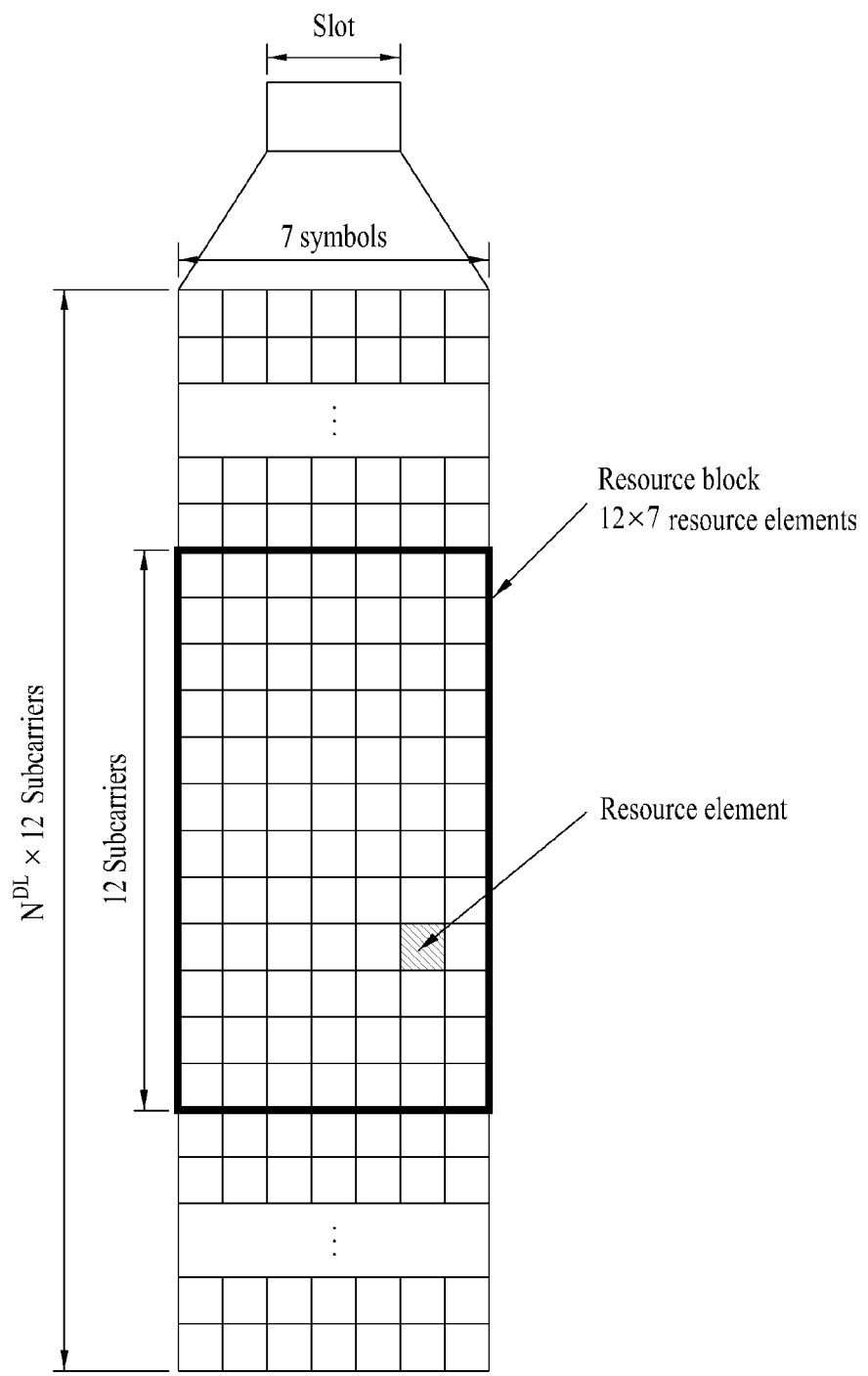
FIG. 3 is a diagram for one example of a resource grid for a downlink slot.

FIG. 3 is a diagram for one example of a resource grid for a downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
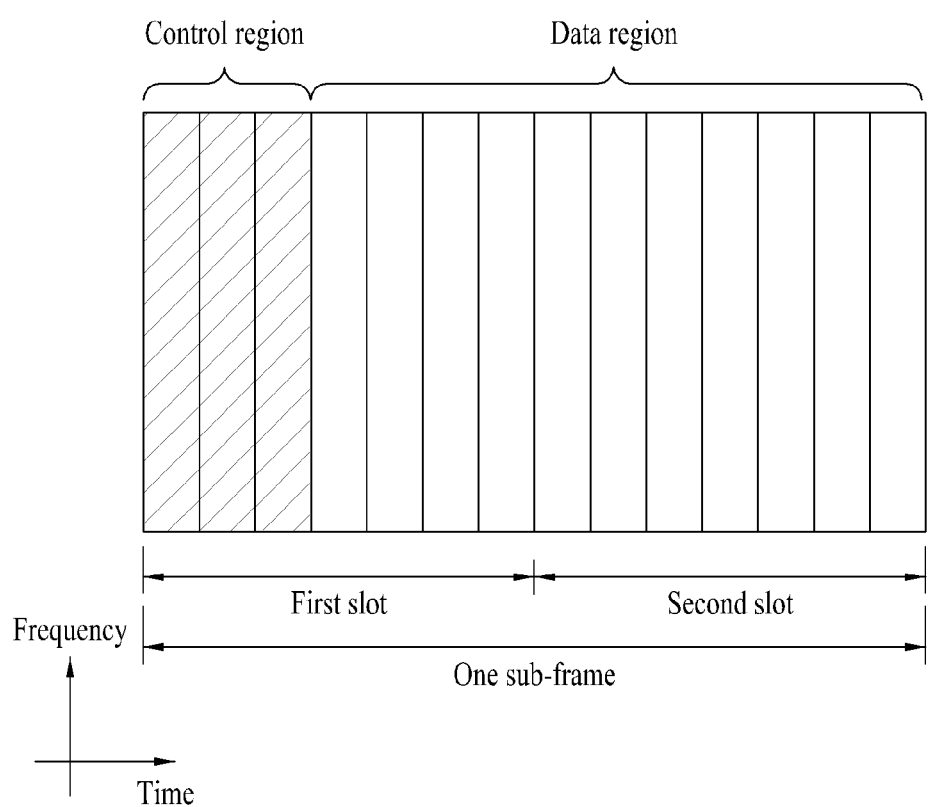
FIG. 4 is a diagram for a structure of a downlink subframe.

FIG. 4 is a diagram for a structure of a downlink (DL) subframe.

Referring to FIG. 4, maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request). Control information carried on PDCCH may be called downlink control information (hereinafter abbreviated DCI). The DCI may include UL resource allocation information, DL resource allocation information or a UL transmission (Tx) power control command for a random UE (user equipment) group.

PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs.

A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 5:
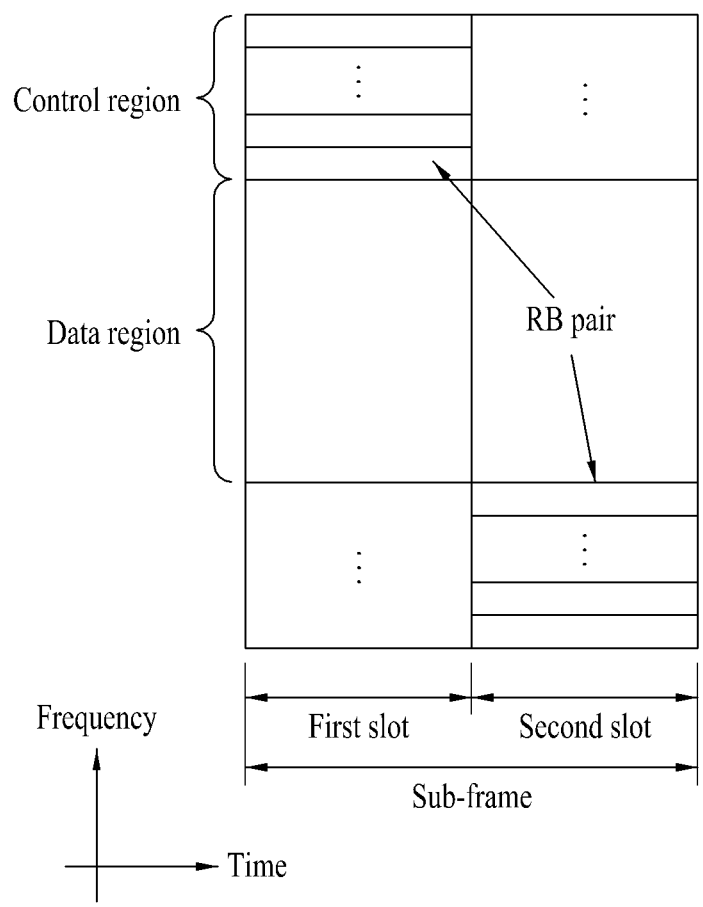
FIG. 5 is a diagram for a structure of an uplink subframe.

FIG. 5 is a diagram for a structure of an uplink (UL) subframe.

Referring to FIG. 5, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

1.2. Downlink Reference Signal

Since a data/signal is transmitted on a radio channel in a wireless communication system, the data/signal may be distorted on radio in the course of the transmission. In order for a receiving end to correctly receive the distorted signal, it is preferable that the signal received by being distorted is corrected using channel information. In order for a transmitting end and/or a receiving end to detect the channel information, it is able to use a reference signal (RS) known to both of the receiving end and the transmitting end. The reference signal may be called a pilot signal.

When a transmitting end transmits or receives data using MIMO antennas, in order for a receiving end to accurately receive the data, it is preferable that a channel state between a transmitting antenna and a receiving antenna is detected. In doing so, in order for the receiving end to detect the channel state, it is preferable that each transmitting antenna of the transmitting end has an individual reference signal.

Downlink reference signals may include a common reference signal (CRS) shared with all user equipments in a cell and a dedicated reference signal (DRS) for a specific user equipment only. Using these reference signals (CRS, DRS), information for demodulation and channel measurement can be provided by a transmitting end.

A receiving end (e.g., a user equipment) measures a channel state using CRS and can feed such an indicator related to a channel quality as a CQI (Channel Quality Indicator), a PMI (Precoding Matrix Index) and/or an RI (Rank Indicator) back to a transmitting end (e.g., a base station). In the embodiments of the present invention, the CRS may be called a cell-specific reference signal (RS). Yet, a reference signal related to a feedback of a channel state information can be defined as CSI-RS.

DRS can be transmitted on resource elements to user equipments if demodulation of data on PDSCH is necessary. A user equipment can receive information indicating a presence or non-presence of DRS by an upper layer signaling. The DRS is valid only if the corresponding PDSCH is mapped. In the embodiments of the present invention, the DRS may be called a UE-specific reference signal (RS) or a demodulation reference signal (DMRS).

FIG. 6 is a diagram to illustrate one example of a reference signal pattern mapped to a DL resource block (RB) pair defined in 3GPP LTE system.

A DL resource block (RB) pair, which is a unit for mapping a reference signal, may be configured with '1 subframe in time domain×12 subcarriers in frequency domain'. In particular, one resource block on a time axis (x-axis) may have a length of 14 OFDM symbols in case of a normal CP (cyclic prefix) [cf. FIG. 6 (*a*)] or a length of 12 OFDM symbols in case of an extended CP (cyclic prefix) [cf. FIG. 6 (*b*)].

Referring to FIG. 6, resource elements (REs) denoted by 0, 1, 2 and 3 in each resource block indicate resource elements to which CRSs for antenna port indexes 0, 1, 2 and 3 of a transmitting end (e.g., a base station) are mapped, respectively. And, resource elements denoted by 'D' mean DRS-mapped resource elements.

CRS is a reference signal receivable in common by all user equipments (UEs) in a cell and is distributed across a whole band. And, the CRS can be used to estimate a channel of a physical antenna. The CRS may be used for channel state information (CSI) and data demodulation.

The CRS may be defined in various forms in accordance with antenna configuration in a transmitting end (e.g., a base station). In 3GPP LTE (e.g., Rel-8/9) system, a transmitting end is able to support up to 4 transmitting antennas.

In case that MIMO antennas are supported, when reference signals are transmitted from at least one antenna port, a reference signal is carried on specific resource elements depending on a prescribed pattern. In doing so, a resource element carrying a reference signal for one antenna port does not carry a references signal for another antenna port. In particular, reference signals on different antennas do not overlap each other.

2. Cell Measurement in Heterogeneous Network 2.1. Heterogeneous Network

Heterogeneous network/deployments means a structure in which micro cells for low-power/short-range communication coexist in a macro cell based homogeneous network. The micro cell may be called a pico cell, a femto cell, an HeNB (home evolved Node B), a relay or the lie. For clarity, these terms shall be commonly named a micro cell.

A macro cell (or a macro base station) has a wide coverage and a high transmission power and means a general cell (or base station) of a wireless communication system. A micro cell (or a micro base station) is a small version of a macro cell, can independently operate by performing most of functions of the macro cell, and means a cell (or base station) overlaid in a macro cell covered area or a cell (or base station) of a non-overlay type that can be installed in a shadow area not covered by the macro cell. The micro cell has a coverage narrower than that of a macro cell and a transmission power lower than that of the macro cell and is able to accommodate user equipments less than those of the macro cell.

A user equipment may be directly served by a macro cell or may be served by a micro cell. Occasionally, a user equipment existing within a coverage of a micro cell may be served by the macro cell.

In accordance with a presence or non-presence of restriction put on a user equipment, a micro cell may be classified into two types. The $1^{st}$ type means a CSG (closed subscriber group) cell that does not grant an access of a previous macro user equipment (e.g., a user equipment served by a macro cell) or accesses of other micro user equipments (e.g., user equipments served by a micro cell) without authentication. And, the $2^{nd}$ type means an OASC (open access subscriber group) or OSG (open subscriber group) cell that grants an access of a previous macro user equipment or accesses of other micro user equipments.

In a heterogeneous network environment having a macro cell and a micro cell coexist therein, inter-cell interference more serious than that of a homogeneous network environment having a macro cell (or a micro cell) exist therein only may occur. In particular, when a terminal is located on a boundary between overlapping cells in the heterogeneous network environment, since signals transmitted from the overlapping cells work as interference on each other, measurement accuracy of RSRP/RSRQ (reference signal received power/reference signal received quality) can be considerably lowered.

In 3GPP LTE-A system, many ongoing efforts are made to research and develop eICIC (enhanced Inter-Cell Interference Coordination) as one of methods for interference coordination between base stations. A cell causing interference is defined as an aggressor cell or a primary cell and a cell receiving interference is defined as a victim cell or a secondary cell. In a specific subframe, the aggressor cell or the primary cell stops a data transmission, thereby enabling a user equipment to maintain an access to the victim cell or the secondary cell in the corresponding subframe. Namely, according to such a method, when a macro cell and a micro cell coexist, if a prescribed base station temporarily stops a signal transmission to a user equipment receiving a considerably high interference in a prescribed area, an interference signal can be barely sent.

A macro cell may become an aggressor cell or a primary cell and a micro cell may become a victim cell or a secondary cell. On the contrary, a micro cell may become an aggressor cell or a primary cell and a macro cell may become a victim cell or a secondary cell.

In the eICIC applied LTE-A system, for compatibility with a user equipment of an existing LTE system, a separate subframe is not applied but a subframe, to which data of the rest of part is not assigned except minimum signals (e.g., CRS, etc.) necessary for a user equipment operation, is used. In particular, a macro cell provides a subframe called ABS (or ABSF: almost blank subframe) to a user equipment served by a micro cell, and more particularly, to a user equipment located at an edge of an overlapping cell and any DL control channels and data channels are not transmitted in the ABS except CRS, thereby protecting the user equipment against strong interference attributed to the macro cell. Yet, if the ABS coincides with an MBSFN (multicast broadcast single frequency network) subframe in which any signals are not transmitted on a data region, CRS is not transmitted on a data region of the ABS. In particular, in case of an MBSFN ABS, all CRSs except a $1^{st}$ CRS (i.e., CRS transmitted in $0^{th}$ OFDM symbol) are removed, thereby excluding inter-CRS interference in $4^{th}$, $7^{th}$ and $11^{th}$ OFDM symbol durations including the rest of the CRSs except the $1^{st}$ CRS.

In eICIC situation, it is able to know a structure of a subframe of each base station by a signal exchange through a mutual X2 interface connection between a macro cell and a micro cell. For instance, a macro cell and a micro cell exchange information on MBSFN subframe and information on a subframe working as ABS with each other through X2 interface based signaling.

On the other hand, since an X2 interface does not exist between a macro cell and a femto cell, a predefined ABS pattern is applied to the femto cell by the configuration through OAM (operation, administration and maintenance). For instance, in order to obtain information on MBSFN subframe of a macro cell, a femto cell receives system information broadcasted by wireless from the macro cell and then acquires MBSFN subframe information or can acquire MBSFN subframe information of the macro cell from a control station of a core network.

Figure 7:
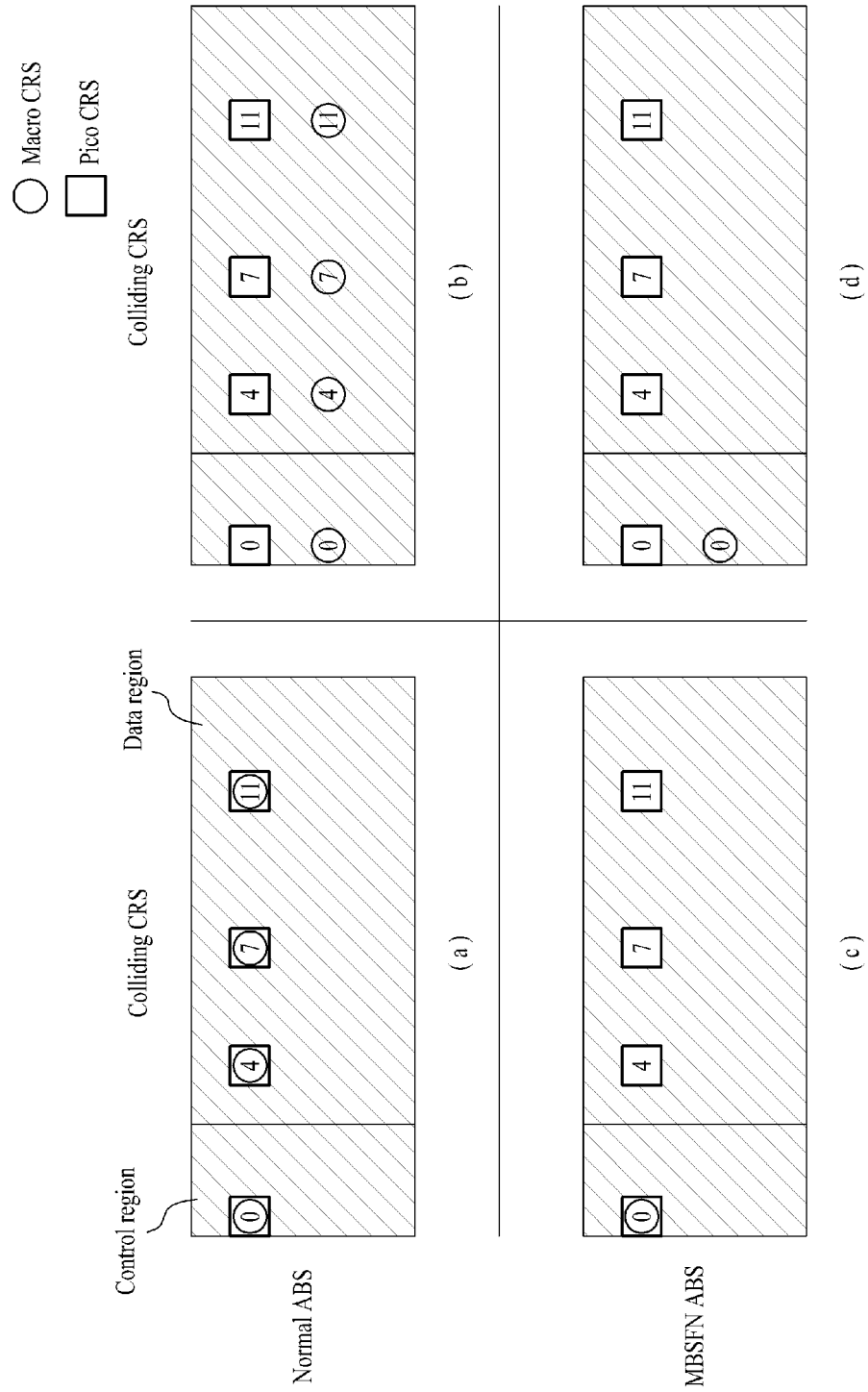
FIG. 7 is a diagram for one example of ABS patterns of macro cell and pico cell in an eICIC applied system.

FIG. 7 is a diagram for one example of ABS patterns of macro cell and pico cell in an eICIC applied system.

Referring to FIG. 7, in case that eICIC is applied, 4 kinds of cases may exist depending on a signal transmission pattern between two base stations in general.

FIG. 7 (a) shows a case of a normal ABS with colliding CRS. In particular, when a type of a subframe of each of a macro cell and a pico cell is a normal subframe, if a CRS location of the macro cell is equal to a CRS location of the pico cell, CRSs overlap each other to work as interference mutually. Hence, signal transmission performance is considerably degraded.

FIG. 7 (b) shows a case of a normal ABS with non-colliding CRS. In particular, when a type of a subframe of each of a macro cell and a pico cell is a normal subframe, if a CRS location of the macro cell is not equal to a CRS location of the pico cell, an effect of interference between CRSs does not exist.

FIG. 7 (c) shows a case of an MBSFN ABS with colliding CRS. In particular, when a type of a subframe of a macro cell is an MBSFN subframe and a type of a subframe of a pico cell is a normal subframe, CRSs transmitted in $0^{th}$ symbol are co-located. Since the type of the subframe of the macro cell is the MBSFN subframe, CRS of the macro cell does not exist in each of the remaining $4^{th}$, $7^{th}$ and $11^{th}$ symbols but CRSs transmitted in the $0^{th}$ symbol overlap each other to work as interference mutually.

FIG. 7 (d) shows a case of an MBSFN ABS with non-colliding CRS. When a type of a subframe of a macro cell is an MBSFN subframe and a type of a subframe of a pico cell is a normal subframe, CRSs transmitted in $0^{th}$ symbol are differently located. Since the type of the subframe of the macro cell is the MBSFN subframe, CRS of the macro cell does not exist in each of the remaining $4^{th}$, $7^{th}$ and $11^{th}$ symbols but CRSs transmitted in the $0^{th}$ symbol are differently located. Hence, an effect of interference between the CRSs does not exist.

In case that eICIC is not applied, although a random one of neighbor cells transmits a subframe set to MBSFN, since all CRSs are transmitted in the subframe, a user equipment performs RSRP/RSRQ measurement using all CRSs irrespective of a presence or non-presence of CRS interference with the neighbor cell. On the other hand, if eICIC is applied in LTE/LTE-A system, if a neighbor cell is set to MBSFN, since CRS is transmitted in a $1^{st}$ OFDM symbol only in MBSFN subframe of the neighbor cell, a user equipment should perform the RSRP/RSRQ measurement using a $1^{st}$ CRS of each slot only in case of performing the RSRP/RSEQ measurement.

2.2. The General of Cell Measurement

In 3GPP LTE/LTE-A system, a cell-specific reference signal (CRS) is transmitted in $0^{th}$, $4^{th}$, $7^{th}$ and $11^{th}$ OFDM symbols in each subframe, which is basically used to measure RSRP and RSRQ. In particular, a user equipment measures RSRP and RSRQ using CRS received from each of a macro cell and a micro cell. For instance, when a serving cell of a user equipment corresponds to a macro cell and a micro cell corresponds to a neighbor cell, the user equipment measures RSRP and RSRQ of the serving cell through CRS transmitted from the macro cell and also measures RSRP and RSRQ of the neighbor cell through CRS transmitted from the micro cell.

RSRP (reference signal received power) indicates a linear average for power distribution of resource elements carrying a cell-specific reference signal (CRS) within a measurement frequency band. For the RSRP determination, it is able to use a cell-specific reference signal $R_0$ corresponding to an antenna port '0'. Moreover, for the RSRP determination, it is able to use a cell-specific reference signal $R_1$ corresponding to an antenna port '1' in addition. In case that reception diversity is used by a user equipment, a reported value may not be smaller than a corresponding RSRP of an individual diversity branch. A measurement frequency band used by a user equipment to determine RSRP and the number of resource elements used within a measurement interval can be determined by the user equipment unless they meet the corresponding measurement accuracy requirements. Moreover, a power per resource element can be determined from the energy received within a part of a symbol except a cyclic prefix (CP).

RSRQ (reference signal received quality) indicates (N×RSRP)/(E-UTRA carrier RSSI (received signal strength indicator)). In this case, the N means the number of resource blocks (RBs) on E-UTRA carrier RSSI measurement band. And, the measurements on the numerator and denominator in the above expression can be found from a set of the same resource blocks (RBs).

The E-UTRA carrier RSSI (received signal strength indicator) is configured with a linear average for a total reception power detected from all sources including a serving cell and non-serving cell of co-channel within OFDM symbols including a reference symbol corresponding to an antenna port '0' in a measurement band, neighbor channel interference, thermal noise and the like. In case that specific subframes for performing RSRQ measurement are indicated by upper layer signaling, RSSI is measured through all OFDM symbols in the indicated subframes. In case that reception diversity is used by a user equipment, a reported value may not be smaller than a corresponding RSRP of an individual diversity branch.

2.2.1. Subframe Pattern Information

A radio resource control (RRC) layer is defined in a control plane only. The RRC layer is responsible for controlling logical channels, transport channels and physical channels in association with configuration, reconfiguration and release of radio bearers (RBs). The radio bearer means a service provided by a $2^{nd}$ layer for the data delivery between a user equipment and E-UTRAN. To this end, the RRC layers exchange messages with each other between the user equipment and the network.

In the following description, an RRC state of a user equipment and an RRC connection method are explained.

First of all, the RRC state means whether an RRC of a user equipment has a logical connection with an RRC of E-UTRAN. If the RRCs are connected with each other, it is called RRC_CONNECTED state. If the RRCs are not connected with each other, it is called RRC_IDLE state. Since RRC connection exists in a user equipment in RRC_CONNECTED state, E-UTRAN is able to recognize a presence of the corresponding user equipment. Hence, the E-UTRAN is able to effectively control the user equipment. On the contrary, E-UTRAN is unable to recognize a user equipment in RRC_IDLE state. And, this user equipment is managed by a core network by a tracking area unit which is a unit of an area larger than a cell. In particular, a presence or non-presence of a user equipment in RRC_IDLE state is recognizable by a larger area unit and should enter RRC_CONNECTED state to receive such a general mobile communication service as a voice service and a data service.

When a user of a user equipment initially turns on a power of the user equipment, the user equipment searches for a suitable cell and then stays in RRC_IDLE state in the corresponding cell. If the user equipment staying in the RRC_IDLE state needs to establish an RRC connection, it establishes the RRC connection with an RRC of E-UTRAN by RRC connection procedure and then enters RRC_CONNECTED state. The user equipment in the idle state may need to establish an RRC connection due to the following reasons. First of all, an uplink data transmission is necessary due to a user's call attempt and the like. Secondly, if a paging message is received from E-UTRAN, it is necessary to send a response message in response to the received paging message.

Thus, in order to make a transition to RRC_Connected state, a user equipment performs an RRC connection process and sends an RRC connection request message to a serving cell. If receiving an RRC connection setup message from the serving cell in response to the RRC connection request message, the user equipment sends an RRC connection setup complete message to the serving cell.

After the RRC_Connected state has been entered, if it is necessary to reconfigure the RRC connection, the serving cell sends an RRC connection reconfiguration message to the user equipment. In this case, the RRC connection reconfiguration message may include radio resource configuration dedicated ('RadioResourceConfigDedicated') information element (IE) and measurement configuration ('Measurement Config'). In this case, the 'Measurement Config' includes 'measObjectToRemoveList' indicating a list of 'measObject' to be removed and 'measObjectToAddModList' indicating a list to be newly added or modified. Moreover, in the 'measObject', 'MeasObjectCDMA2000', 'MeasObjctEUTRA', 'MeasObjectGERAN' and the like are included depending on the communication technology.

In eICIC situation, for the serving cell measurements, 'measSubframePattern-Serv' is added to a field 'RadioResourceConfigDedicated' in the RRC connection reconfiguration message. And, for neighbor cell measurements, 'measSubframeCellList' and 'measSubframePattern-Neigh' are added to a field 'MeasObjectEUTRA'.

Information element (IE) 'RadioResourceConfigDedicated' is used to setup/modify/release a radio bearer, modify a MAC main configuration, modify a Semi-Persistent Scheduling (SPS) configuration, or modify a dedicated physical configuration. And, information 'measSubframePattern-Sere' means the information on a pattern for restricting measurement resources in a time domain for measurements (RSRP, RSRQ, radio link monitoring) of a serving cell.

Table 1 shows one example of a field 'RadioResourceConfigDedicated' through ASN.1 (Abstract Syntax Notation One).

TABLE 1

```
-- ASN1START
RadioResourceConfigDedicated ::=    SEQUENCE {
    srb-ToAddModList            SRB-ToAddModList            OPTIONAL,       -- Cond HO-Conn
    drb-ToAddModList            DRB-ToAddModList            OPTIONAL,       -- Cond HO-
toEUTRA
    drb-ToReleaseList           DRB-ToReleaseList           OPTIONAL,       -- Need ON
    mac-MainConfig              CHOICE {
        explictValue                MAC-MainConfig,
        defaultValue                NULL
    }       OPTIONAL,                                                       -- Cond HO-
toEUTRA2
    sps-Config                  SPS-Config                  OPTIONAL,       -- Need ON
    physicalConfigDedicated     PhysicalConfigDedicated     OPTIONAL,       -- Need ON
    ...,
    [[ rlf-TimersAndConstants-r9    RLF-TimersAndConstants-r9   OPTIONAL    -- Need ON
    ]],
    [[ measSubframePattern-Serv-r10  CHOICE {
        release                     NULL,
        setup                       MeasSubframePattern-r10
    }                                                       OPTIONAL    -- Need ON
    ]]
}
RadioResourceConfigDedicatedSCell-r10 ::=   SEQUENCE {
    -- UE specific configuration extensions applicable for an SCell
    physicalConfigDedicated     PhysicalConfigDedicatedSCell-r10    OPTIONAL,   -- Need ON
    ...
}
SRB-ToAddModList ::=        SEQUENCE (SIZE (1..2)) OF SRS-ToAddMod
SRS-ToAddMod ::=    SEQUENCE {
    srb-Identity                INTEGER (1..2),
    rlc-Config                  CHOICE {
        explictValue                RLC-Config,
        defaultValue                NULL
    }       OPTIONAL,                                                       -- Cond Setup
    logicalChannelConfig        CHOICE {
        explictValue                LogicalChannelConfig,
        defaultValue                NULL
    }'      OPTIONAL,                                                       -- Cond Setup
    ...
}
DRS-ToAddModList ::=        SEQUENCE (SIZE (1..maxDRS)) OF DRS-ToAddMod
DRB-ToAddMod ::=    SEQUENCE {
    sps-BearerIdentity          INTEGER (0..15),            OPTIONAL,       -- Cond DRS-Setup
    drb-Identity                DRB-Identity,
    pdcp-Config                 PDCP-Config                 OPTIONAL,       -- Cond PDCP
    rlc-Config                  RLC-Config                  OPTIONAL,       -- Cond Setup
    logicalChannelIdentity      INTEGER (3..10),            OPTIONAL,       -- Cond DRS-Setup
    logicalChannelConfig        LogicalChannelConfig        OPTIONAL,       -- Cond Setup
    ...
}
DRB-ToReleaseList ::=       SEQUENCE (SIZE (1..maxDRS)) OF DRS-Identity
-- ASN1STOP
```

Table 2 shows one example of factors included in a field 'RadioResourceConfigDedicated'.

TABLE 2

Field Description of RadioResourceConfigDedicated logicalChannelConfig
Used to indicate whether a logical channel configuration is clearly signalled for SRB (Signalling Radio Bearer) or set to a default logical channel configuration for SRB 1 or SRB 2.
logicalChannelIdentity
Logical channel identifier for identifying both UL (Uplink) and DL (Downlink)
mac-MainConfig
Used to indicate whether mac-MainConfig is clearly signalled or set to a default MAC main configuration.
measSubframePattern-Serv
Time domain resource restriction pattern for performing measurements (RSRP, RSRQ and radio link monitoring) on a serving cell
physicalConfigDedicated
Default dedicated physical configuration
rlc-Config
Used to whether RLC (radio link control) configuration is clearly signalled for SRBs or set to a defined value in the RLC default configuration for SRB 1 or SRB 2. RLC AM (Acknowledged Mode) is applicable only to RLC mode for SRB 1 and SRB 2. E-UTRAN does not reconfigure an RLC mode of a DRB (data radio bearer) except a case that an overall configuration option is used. E-UTRAN can reconfigure a field size of UM (Unacknowledged Mode) RLC SN (Sequence Number) in case of a handover in E-UTRA or a case of a $1^{st}$ reconfiguration after RRC connection reestablishment.
sps-Config
Default SPS configuration
srb-Identity
'1' is applied only to SRB 1. '2' is applied only to SRB 2.

'MeasObjectEUTRA' field information element clearly describes information applicable to an intra-frequency E-UTRA cell or an inter-frequency E-UTRA cell.

Table 3 shows one example of a field 'MeasObjectEUTRA' through ASN.1.

TABLE 3

```
-- ASN1START
MeasObjectEUTRA ::=                SEQUENCE {
    carrierFreq                        ARFON-ValueEUTRA,
    allowedMeasSandwidth               AllowedmeasBandwidth,
    presenceAntennaPort1               PresenceAntennaPort1,
    neighCellConfig                    NeighCellConfig,
    offsetFreq                         Q-offsetRange              DEFAULT dBO,
    -- Cell list
    cellsToRemoveList                  CellIndexList              OPTIONAL,    -- Need ON
    cellsToAddModList                  CellsToAddModList          OPTIONAL,    -- Need ON
    -- Black list
    blackCellsToRemoveList             CellIndexList              OPTIONAL,    -- Need ON
    blackCellsToAddModList             BlackCellsToAddModList     OPTIONAL,    -- Need ON
    cellsForWhichToReportCGI           PhysCellId                 OPTIONAL,    -- Need ON
    ...,
    [[measCycleSCell-v10x0             MeasCycleSCell-v10x0       DEFAULT sf320,
        measSubframsPatternConfig-Neigh-r10          CHOICE {
            release                                      NULL,
            setup                                        SEQUENCE {
                measSubframePattern-Neigh-r10                MeasSubframePattern-Neigh-r10,
                measSubframeCellList-r10                     MeasSubframeCellList-r10   OPTIONAL   --
Need OF
            }
        }      OPTIONAL                                   -- Need ON
    ]]
}
CellsToAddModList ::=              SEQUENCE (SIZE (1..maxCellMeas)) OF CellsToAddMod
CellsToAddMod ::=   SEQUENCE {
    cellIndex                          INTEGER (1..maxCellMeas),
    physCellId                         PhysCellId,
    cellIndividualOffset               Q-offsetRange
}
```

TABLE 3-continued

```
BlackCellsToAddModList ::=            SEQUENCE (SIZE (1..maxCellMeas)) OF BlackCellsToAddMod
BlackCellsToAddMod ::=   SEQUENCE {
    cellIndex                         INTEGER (1..maxCellMeas),
    physCellIdRange                   PhysCellIdRange
}
MeasCycleSCell-v10x0 ::=              ENUMERATED (sf160, sf256, sf320, sf512,
                                                  sf640, sf1024, sf1230, spare1)
MeasSubframeCellList-r10 ::=  SEQUENCE (SIZE(1..maxCellMeas)) OF PhysCellIdRange
-- ASN1STOP
```

Table 4 shows one example of factors included in a field 'MeasObjectEUTRA'.

TABLE 4

Field Description of MeasObjectEUTRA blackCellsToAddMoList

List of cells for adding/modifying a cell to/in a black list of cells blackCellsToRemoveList List of cells for removing a cell from a black list of cells carrierFreq Identify E-UTRA carrier frequency for validating this configuration.

cellIndex

Entry index in a cell list.

If this value is applicable to a whole range of cells, this entry may be related to a range of a corresponding cell.

cellIndividualOffset

Cell-individual offset applicable to a specific cell.

A value of 'dB −24' amounts to −24. A value of 'dB −22' amounts to −22 dB.

cellsToAddModList

List of cells to be added/modified to/in a cell list cellsToRemoveList

List of cells to be removed from a cell list measCycleSCell

Parameter: $T_{measure\_scc}$

This parameter is set to a frequency for enabling SCell (Secondary Cell) to be indicated by measObject and is used in a disabled state. Yet, if SCell is not configured, this parameter is not signalled.

measSubframeCellList

List of cells to which measSubframePatternNeigh is applied

If not included, a UE applies a time domain measurement resource restriction pattern to all neighbour cells.

measSubframePattern-Neigh

Time domain measurement resource restriction pattern applied to measure RSRP and RSRQ on a neighbour cell on a carrier frequency indicated by carrierFreq offsetFreq Offset value applicable to a carrier frequency A value of 'dB −24' amounts to −24 dB. A value of 'dB −22' amounts to −22 dB.

physCellId

Physical cell identity of a cell included in a cell list physCellIdRange

Range of a physical cell identity included in a black list or a range of physical cells

2.2.2. Accuracy Requirements for RSRP and RSRQ Measurements

In case that a time domain measurement resource restriction pattern for performing RSRP measurements is configured by upper layer signaling, an absolute accuracy of RSRP is required for measuring a cell operating on the same frequency of a serving cell.

Table 5 shows one example of an intra-frequency absolute accuracy of RSRP under time domain measurement resource restriction.

TABLE 5

| Parameter | Unit | Accuracy [dB] Normal condition | Accuracy [dB] Extreme condition | Conditions[1,2] Band 1, 4, 6, 10, 11, 18, 19, 21, 24, 33, 34, 35, 36, 37, 38, 39, 40, 42, 43 Io | Bands 2, 5, 7 Io | Bands 3, 8, 12 13, 14, 17, 20 Io | Bands 9, 41 Io |
|---|---|---|---|---|---|---|---|
| RSRP for Es/Iot ≥ [−4] dB | dBm | ±6 | ±9 | −121 dBm/15 kHz ... −70 dBm/$BW_{Channel}$ | −119 dBm/15 kHz ... −70 dBm/$BW_{Channel}$ | −118 dBm/15 kHz ... −70 dBm/$BW_{Channel}$ | −120 dBm/15 kHz ... −70 dBm/$BW_{Channel}$ |
| RSRP for Es/Iot ≥ [−4] dB | dBm | ±8 | ±11 | −70 dBm/$BW_{Channel}$ ... −50 dBm/$BW_{Channel}$ | −70 dBm/$BW_{Channel}$ ... −50 dBm/$BW_{Channel}$ | −70 dBm/$BW_{Channel}$ ... −50 dBm/$BW_{Channel}$ | −70 dBm/$BW_{Channel}$ ... −50 dBm/$BW_{Channel}$ |

Note
[1] Io is assumed to have constant EPRE across the bandwidth.

Note
[2] Io is defined over REs in subframes indicated by the time domain measurement resource restriction pattern configured for performing RSRP measurements of this cell.

In this case, the accuracy requirements according to table 5 are valid only if the following conditions are met. In particular, cell-specific reference signal in a measured cell is transmitted through 1, 2 or 4 antenna ports and reference sensitivity should be met as Formula 1 in the following.

$RSRP|_{dBm} \geq -127$ dBm (case of bands 1, 4, 6, 10, 11, 18, 19, 21, 24, 33, 34, 35, 36, 37, 38, 39, 40, 42 and 43)

$RSRP|_{dBm} \geq -126$ dBm (case of bands 9 and 41)

$RSRP|_{dBm} \geq -125$ dBm (case of bands 2,5 and 7)

$RSRP|_{dBm} \geq -124$ dBm (case of bands 3,8,12,13,14,17 and 20)     [Formula 1]

In Formula 1, dBm is the unit indicating a power (Watt) and 1 mW=0 dBm. A time domain measurement resource restriction pattern configured for a measured cell indicates at least one subframe per radio frame for performing RSRP measurements.

If a time domain measurement resource restriction pattern is configured by upper layer signaling, a relative accuracy of RSRP for performing RSRP measurements is required for measuring a cell operating on the same frequency of a serving cell.

Table 6 shows one example of an intra-frequency relative accuracy of RSRP under time domain measurement resource restrictions.

TABLE 6

| Parameter | Unit | Accuracy [dB] Normal condition | Accuracy [dB] Extreme condition | Conditions[1,2,3] Band 1, 4, 6, 10, 11, 18, 19, 21, 24, 33, 34, 35, 36, 37, 38, 39, 40, 42, 43 Io | Bands 2, 5, 7 Io | Bands 3, 8, 12 13, 14, 17, 20 Io | Band 9, 41 Io |
|---|---|---|---|---|---|---|---|
| RSRP for Es/Iot ≥ [TBD] dB | dBm | ±2 | ±3 | −121 dBm/15 kHz ... −50 dBm/$BW_{Channel}$ | −119 dBm/15 kHz ... −50 dBm/$BW_{Channel}$ | −118 dBm/15 kHz ... −50 dBm/$BW_{Channel}$ | −120 dBm/15 kHz ... −50 dBm/$BW_{Channel}$ |
| RSRP for Es/Iot ≥ [−4] dB | dBm | ±3 | ±3 | −121 dBm/15 kHz ... −50 dBm/$BW_{Channel}$ | −119 dBm/15 kHz ... −50 dBm/$BW_{Channel}$ | −118 dBm/15 kHz ... −50 dBm/$BW_{Channel}$ | −120 dBm/15 kHz ... −50 dBm/$BW_{Channel}$ |

Note
[1] Io is assumed to have constant EPRE across the bandwidth.

Note
[2] The parameter Es/Iot is the minimum Es/Iot of the pair of cells to which the requirement applies.

Note
[3] Io is defined over REs in subframes indicated by the time domain measurement resource restriction pattern configured for performing RSRP measurements of this cell.

In this case, the accuracy requirements according to Table 6 are valid only if the following conditions are met. In particular, cell-specific reference signal in a measured cell is transmitted through 1, 2 or 4 antenna ports and reference sensitivity should be met as Formula 2 in the following.

$$RSRP1,2|_{dBm} \geq -127 \text{ dBm(case of bands 1, 4, 6, 10,} \\ 11, 18, 19, 21, 24, 33, 34, 35, 36, 37, 38, 39, 40, 42 \\ \text{and 43)}$$

$$RSRP1,2|_{dBm} \geq -126 \text{ dBm(case of bands 9 and 41)}$$

$$RSRP1,2|_{dBm} \geq -125 \text{ dBm(case of bands 2,5 and 7)}$$

$$RSRP1,2|_{dBm} \geq -124 \text{ dBm(case of bands 3, 8, 12, 13,} \\ 14, 17 \text{ and 20)} \quad \text{[Formula 2]}$$

A time domain measurement resource restriction pattern configured for a measured cell indicates at least one subframe per radio frame for performing RSRP measurements.

If a time domain measurement resource restriction pattern is configured by upper layer signaling, an absolute accuracy of RSRQ for performing RSRQ measurements is required for measuring a cell operating on the same frequency of a serving cell.

Table 7 shows one example of an intra-frequency relative accuracy of RSRQ under time domain measurement resource restrictions.

frame indicated by the time domain measurement resource restriction pattern configured to the measured cell.

Thus, a user equipment (e.g., 3GPP Release-10) should measure RSRQ in an interval set up by measSubframePattern-Serv and measSubframePattern-Neigh only. Yet, RSRP is preferably measured within this pattern only for the accuracy requirements despite that such intra-pattern measurements are not restricted.

3. Cell Measuring Method Using RSSI

As mentioned in the foregoing description, in a situation that a macro cell and a pico cell coexist, if a macro base station (eNB) transmits ABS, a user equipment existing in an extended region of the pico cell performs a cell selection by measuring a signal strength and quality of the macro base station and a signal strength and quality of the pico base station.

Figure 8:
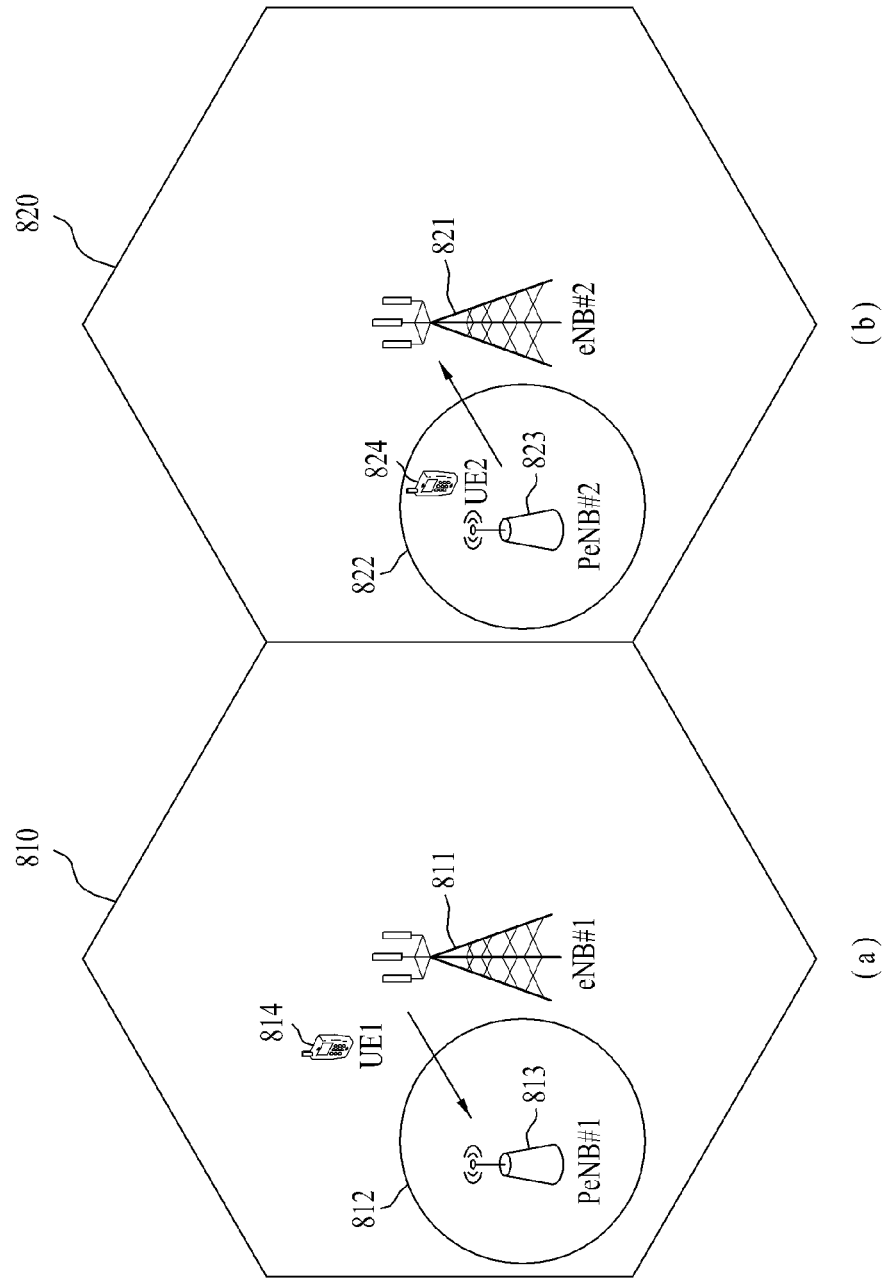
FIG. 8 is a diagram for one example of a scenario of a user equipment in a situation that a macro cell and a pico cell coexist.

FIG. 8 is a diagram for one example of a scenario of a user equipment in a situation that a macro cell and a pico cell coexist.

Referring to FIG. 8, as pico base stations (PeNB 1, PeNB 2) 813 and 823 exist within cell areas 810 and 820, which are covered by macro base stations (eNB 1, eNB 2) 811 and 812, of the macro base stations eNB 1 and eNB 2, respectively, cell areas 812 and 822 of the pico base stations PeNB 1 and PeNB 2 and the cell areas 810 and 820 of the macro base stations

TABLE 7

| | | | Conditions[1,2] | | | |
|---|---|---|---|---|---|---|
| | | Accuracy [dB] | Bands 1, 4, 6, 10, 11, 18, 19, 21, 24, 33, 34, 35, 36, 37, 38, | | Bands 3, 8, 12, | |
| Parameter | Unit | Normal condition | Extreme condition | 39, 40, 42, 43 Io | Bands 2, 5, 7 Io | 13, 14, 17, 20 Io | Bands 9, 41 Io |
| RSRQ when RSRP Es/Iot ≥[TBD] dB | dBm | ±2.5 | ±4 | −121 dBm/ 15 kHz ... −50 dBm/ $BW_{Channel}$ | −119 dBm/ 15 kHz ... −50 dBm/ $BW_{Channel}$ | −118 dBm/ 15 kHz ... −50 dBm/ $BW_{Channel}$ | −120 dBm/ 15 kHz ... −50 dBm/ $BW_{Channel}$ |
| RSRQ when RSRP Es/Iot ≥[−4] dB | dBm | ±3.5 | ±4 | −121 dBm/ 15 kHz ... −50 dBm/ $BW_{Channel}$ | −119 dBm/ 15 kHz ... −50 dBm/ $BW_{Channel}$ | −118 dBm/ 15 kHz ... −50 dBm/ $BW_{Channel}$ | −120 dBm/ 15 kHz ... −50 dBm/ $BW_{Channel}$ |

Note
[1] Io is assumed to have constant EPRE across the bandwidth.

Note
[2] Io is defined over REs in subframes indicated by the time domain measurement resource restriction pattern configured for performing RSRQ measurements of this cell.

In this case, the accuracy requirements according to Table 7 are valid only if the following conditions are met. In particular, cell-specific reference signal in a measured cell is transmitted through 1, 2 or 4 antenna ports and reference sensitivity should be met as Formula 3 in the following.

$$RSRP|_{dBm} \geq -127 \text{ dBm(case of bands 1, 4, 6, 10, 11,} \\ 18, 19, 21, 24, 33, 34, 35, 36, 37, 38, 39, 40, 42 \\ \text{and 43)}$$

$$RSRP|_{dBm} \geq -126 \text{ dBm(case of bands 9 and 41)}$$

$$RSRP|_{dBm} \geq -125 \text{ dBm(case of bands 2, 5 and 7)}$$

$$RSRP|_{dBm} \geq -124 \text{ dBm(case of bands 3, 8, 12, 13, 14,} \\ 17 \text{ and 20)} \quad \text{[Formula 3]}$$

A time domain measurement resource restriction pattern configured for a measured cell indicates at least one subframe per radio frame for performing RSRQ measurements. Moreover, RSRQ measurements are not performed except a subeNB 1 and eNB 2 can coexist. In the situation that the macro cell and the pico cell coexist, scenarios of a user equipment can be summarized into two types as follows.

First of all, a 1st scenario corresponds to a case that a serving cell and a target (neighbor) cell correspond to a macro cell and a pico cell, respectively, as shown in FIG. 8 (a). According to the 1st scenario, a user equipment (UE 1) 814 is communicating with the macro base station (eNB 1) 811. And, the user equipment (UE 1) 814 can finally perform a cell selection of a pico base station by measuring RSRP/RSRQ of the macro base station (eNB 1) 811 and the pico base station (PeNB 1) 813 while moving away into the pico base station (PeNB 1) 813.

Secondly, a 2nd scenario corresponds to a case that a serving cell and a target (neighbor) cell correspond to a pico cell and a macro cell, respectively, as shown in FIG. 8 (b). According to the 2nd scenario, a user equipment (UE 2) 824 is communicating with the pico base station (PeNB 2) 822. And, the user equipment (UE 2) 824 can finally perform a cell selection of the macro base station (eNB 2, 821) by measuring RSRP/RSRQ of the macro base station (eNB 2) 821 and the pico base station (PeNB 2) 823 while moving away into the macro base station (eNB 2) 821.

In the above process, as mentioned in the foregoing description, a user equipment (e.g., 3GPP Release-10) is provided with 'measSubframePattern-Serv' to measure RSRP/RSRQ of a current serving cell through RRC signaling and is also provided with 'measSubframePattern-Neigh' to measure RSRP/RSRQ of a neighbor cell. In particular, the user equipment measures RSRP/RSRQ of the serving cell in a subframe included in 'measSubframePattern-Serv' pattern and also measures RSRP/RSRQ of the neighbor cell in a subframe included in 'measSubframePattern-Neigh' pattern.

When the macro base station is the serving cell or the neighbor cell, the pattern for measuring the RSRP/RSRQ of the macro base station preferably becomes a subset of a subframe except ABS subframe of the macro base station. The reason for this is as follows. First of all, even if the user equipment actually measures the RSRP/RSRQ of the macro base station in the ABS subframe of the macro base station, since an actual service is not performed in the corresponding subframe from the macro base station, it is meaningless to use the pattern for the cell selection. Yet, since a network provides the user equipment with the pattern for the RSRP/RSRQ measurements without considering ABS, the RSRP/RSRQ measurement pattern of the macro base station can be configured in a manner of including the ABS subframe. In this case, the user equipment should measure the RSRP/RSRQ in the subframe except the ABS subframe for the accurate cell selection.

Moreover, it is preferable that a pattern for the RSRP/RSRQ measurements of the pico base station is identical to the ABS subframe of the macro base station or becomes a subset. Yet, as mentioned in the above description, since the network provides the pattern for the RSRP/RSRQ measurements to the user equipment without considering the ABS, the RSRP/RSRQ measurement pattern of the pico base station may be configured in a manner of including non-ABS subframe. In this case, for the accurate cell selection, the user equipment should measure the RSRP/RSRQ in a subframe except the non-ABS subframe, i.e., in the ABS subframe.

In the following description, in order for a user equipment to measure RSRP/RSRQ efficiently and practically, a method of searching a subframe pattern for RSRP/RSRQ measurements on a serving cell and a neighbor cell for a subframe appropriate for RSRP/RSRQ measurements and then measuring RSRP/RSRQ in the found subframe is proposed.

Figure 9:
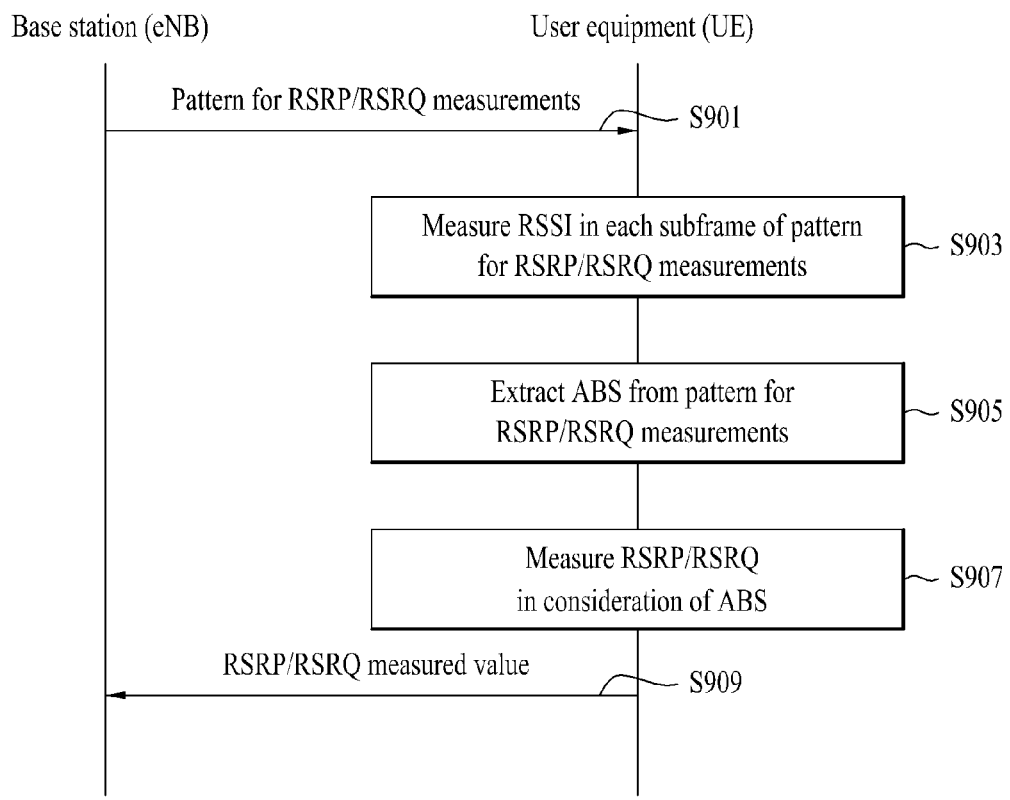
FIG. 9 is a diagram for one example of a procedure of a cell measuring method according to one embodiment of the present invention.

FIG. 9 is a diagram for one example of a procedure of a cell measuring method according to one embodiment of the present invention.

Referring to FIG. 9, a base station of a serving cell transmits a pattern information for RSRP/RSRQ measurements to a user equipment [S901]. In this case, the pattern for the RSRP/RSRQ measurements can include 'measSubframePattern-Serv' pattern or 'measSubframePattern-Neigh' pattern. And, this pattern information may be transmitted to the user equipment through upper layer signaling. The pattern for the RSRP/RSRQ measurements is shared with each base station to have the same pattern. Alternatively, the pattern for the RSRP/RSRQ measurements may have a different pattern for each base station.

Having received the pattern information from the base station, the user equipment measures RSSI in each subframe included in the received pattern for the RSRP/RSRQ measurements [S903]. In this case, the subframe included in the pattern for the RSRP/RSRQ measurements means the subframes in which the user equipment should measure RSRP/RSRQ in accordance with the corresponding pattern.

Having measured the RSSI in each subframe included in the pattern for the RSRP/RSRQ measurements, the user equipment extracts a subframe corresponding to ABS from the subframes included in the pattern for the RSRP/RSRQ measurements [S903]. Since data of a macro base station do not exist in an ABS interval (or subframe) but CRS exists only, an actual RSSI value of the ABS subframe of the macro base station may be smaller than that of a non-ABS subframe. Hence, a subframe with a small RSSI value can be determined as the ABS subframe. In particular, if an RSSI value measured in a specific subframe among the RSSI values measured in the respective subframes included in the pattern for the RSRP/RSRQ measurements is smaller than an RSSI value measured in the rest of the subframes, and more particular, in the rest of the subframes among the contiguous subframes for measuring RSRP/RSRQ according to the pattern for the RSRP/RSRQ measurements, the user equipment determines the corresponding subframe as an ABS subframe.

Moreover, if an RSS value measured in a specific subframe among the RSSI values measured in the respective subframes included in the pattern for the RSRP/RSRQ measurements is smaller than a preset threshold, the user equipment can determine the corresponding subframe as the ABS subframe.

Moreover, the user equipment calculates an average of the RSSI values measured in the respective subframes included in the pattern for the RSRP/RSRQ measurements. If the RSSI value is smaller than the corresponding average value or has a difference from the corresponding average value by a preset threshold at least, the user equipment can determine the corresponding subframe as the ABS subframe.

Having determined the ABS subframe using the RSSI value, the user equipment measures RSRP/RSRQ in consideration of the ABS subframe [S907].

If the cell in which the user equipment measures the RSRP/RSRQ is a macro cell, the user equipment measures the RSRP/RSRQ in the rest of the subframes included in the pattern for the RSRP/RSRQ measurements except the ABS subframe determined in the step S905. In doing so, the user equipment may not measure the RSRP/RSRQ in the rest of the subframes all except the ABS subframe among the subframes included in the pattern for the RSRP/RSRQ measurements. In particular, the user equipment may measure the RSRP/RSRQ in the minimum subframe(s) (except the ABS subframe) for the RSRP/RSRQ measurements. In this case, information on the minimum number of the subframes for the RSRP/RSRQ measurements or a location in the corresponding pattern (e.g., the minimum number of the first or last subframes) can be transmitted to the user equipment by the base station or may be known to both of the base station and the user equipment in advance.

On the other hand, if the cell in which the user equipment measures the RSRP/RSRQ is a pico cell, the user equipment measures the RSRP/RSRQ in the ABS subframe determined in the step S905.

Thereafter, the value of measuring the RSRP/RSRQ in consideration of the ABS subframe in the subframe included in the pattern for the RSRP/RSRQ measurements is reported to the base station by the user equipment [S909]. In doing so, the user equipment calculates an average value for the RSRP/RSRQ measured in the subframe included in the pattern for the RSRP/RSRQ measurements and is then able to report the calculated average value to the base station by predetermined periods.

Figure 10:
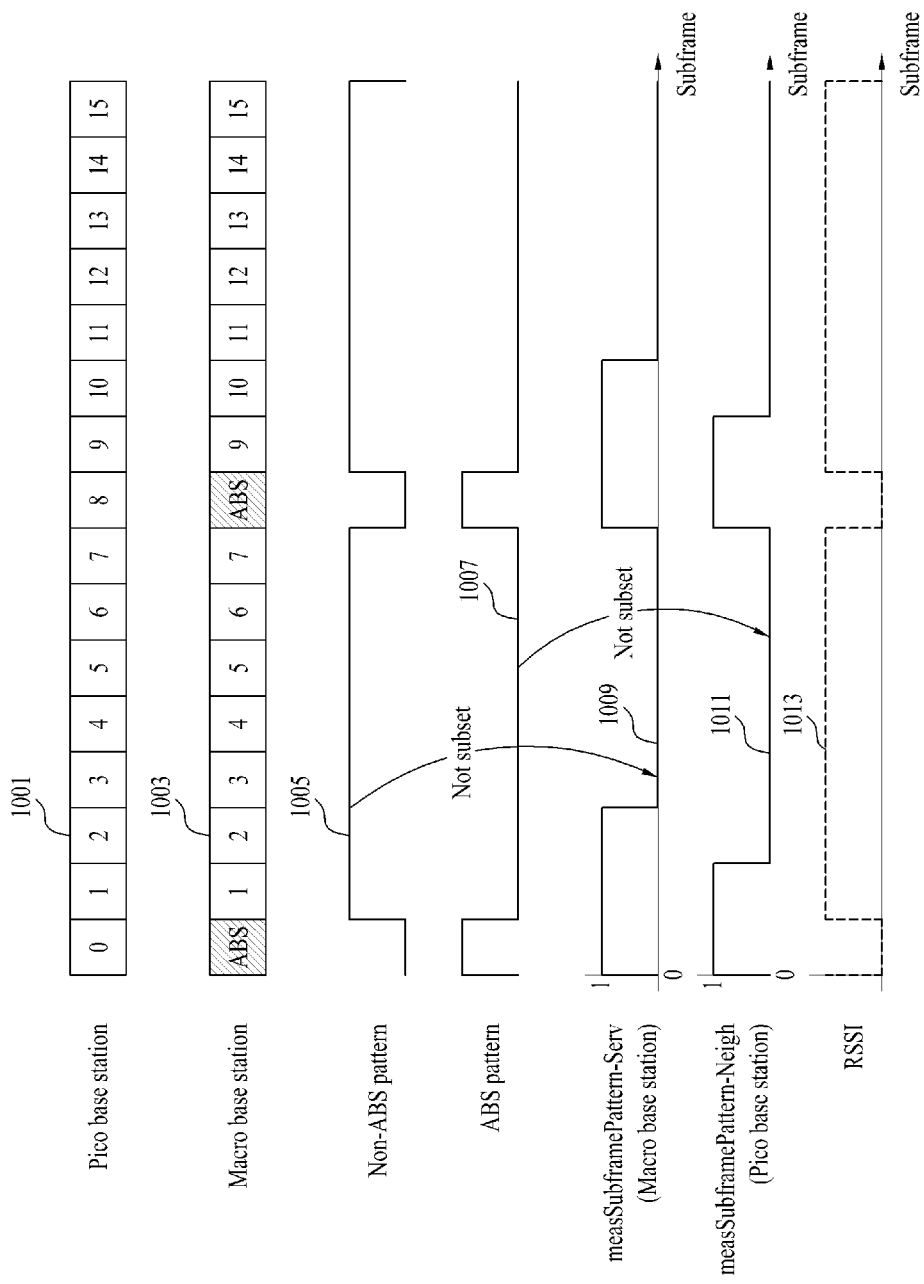
FIG. 10 is a diagram for one example of a cell measuring method according to one embodiment of the present invention.

FIG. 10 is a diagram for one example of a cell measuring method according to one embodiment of the present invention.

When a macro base station operates in ABS, FIG. 10 shows one example of a pattern for RSRP/RSRQ measurements on a serving cell and a neighbor cell if the macro base station and a pico base station correspond to a serving cell and a target (neighbor) cell, respectively. In FIG. 10, a case that a single target (neighbor) cell exists is illustrated. Yet, the same principle is applicable to a case of a plurality of target (neighbor) cells.

Referring to FIG. 10, as ABS is applied to subframes 1003 of a macro base station, $0^{th}$ and $8^{th}$ subframes correspond to ABS subframes. Hence, a non-ABS pattern 1005 of the macro base station and an ABS pattern 1007 of the macro base station are determined.

As mentioned in the foregoing description, since a network provides a pattern for measuring RSRP/RSRQ to a user equipment without considering ABS subframe of a macro base station, a serving cell (macro cell) measurement pattern (measSubframePattern-Serv) 1009 is not included in the non-ABS pattern 1005 of the macro base station [Not Subset]. Moreover, a neighbor cell (pico cell) measurement pattern (measSubframePattern-Neigh) 1011 is not included in the ABS pattern 1007 of the macro base station [Not Subset]. Moreover, looking into RSSI values 1013, an RSSI value in each of subframe #0 and subframe #8 becomes smaller than an RSSI value measured in other subframes due to the ABS operation of the macro base station.

In case that the serving cell (macro cell) measurement pattern (measSubframePattern-Serv) 1009 includes ABS subframe, the user equipment can find the ABS subframe from the serving cell (macro cell) measurement pattern (measSubframePattern-Serv) 1009 using the RSSI value measured in each subframe according to the serving cell (macro cell) measurement pattern (measSubframePattern-Serv) 1009. In particular, the user equipment can find the ABS subframes by determining the subframes (e.g., subframe #0 and subframe #8) having a small RSSI value among the subframes (i.e., subframe #0, subframe #1, subframe #2, subframe #8, subframe #9 and subframe #10) included in the serving cell (macro cell) measurement pattern (measSubframePattern-Serv) 1009 as the ABS subframes. In this case, the user equipment can compare the RSSI values in the contiguous subframes (i.e., subframes #0 to #2, subframes #8 to #10) included in a single pattern. Having found the ABS subframes, the user equipment measures RSRP/RSRQ in the subframes except the ABS subframes for the serving cell (macro cell).

Thus, the user equipment measures the RSRP/RSRQ of the macro base station in the subframes except the ABS subframes, thereby performing a cell selection and a RSRQ measurement more accurately. Substantially, in the cell selection, the value measured in the subframe, which is not the ABS subframe, is more meaningful than the RSRP/RSRQ information of the ABS subframe.

Moreover, if the neighbor cell (pico cell) measurement pattern (measSubframePattern-Neigh) 1011 includes non-ABS subframe, the user equipment can find the ABS subframe from the neighbor cell (pico cell) measurement pattern (measSubframePattern-Neigh) 1011 using the RSSI value measured in each subframe according to the neighbor cell (pico cell) measurement pattern (measSubframePattern-Neigh) 1011. In particular, the user equipment can find the ABS subframes by determining the subframes (e.g., subframe #0 and subframe #8) having a small RSSI value among the subframes (i.e., subframe #0, subframe #1, subframe #8 and subframe #9) included in the neighbor cell (pico cell) measurement pattern (measSubframePattern-Neigh) 1011 as the ABS subframes. In this case, the user equipment can compare the RSSI values in the contiguous subframes (i.e., subframes #0 and #1, subframes #8 and #9) included in a single pattern. Having found the ABS subframes, the user equipment measures RSRP/RSRQ in the ABS subframes only for the neighbor cell (pico cell).

Thus, the user equipment measures the RSRP/RSRQ of the pico base station in the ABS subframes only, thereby performing a cell selection more accurately.

Figure 11:
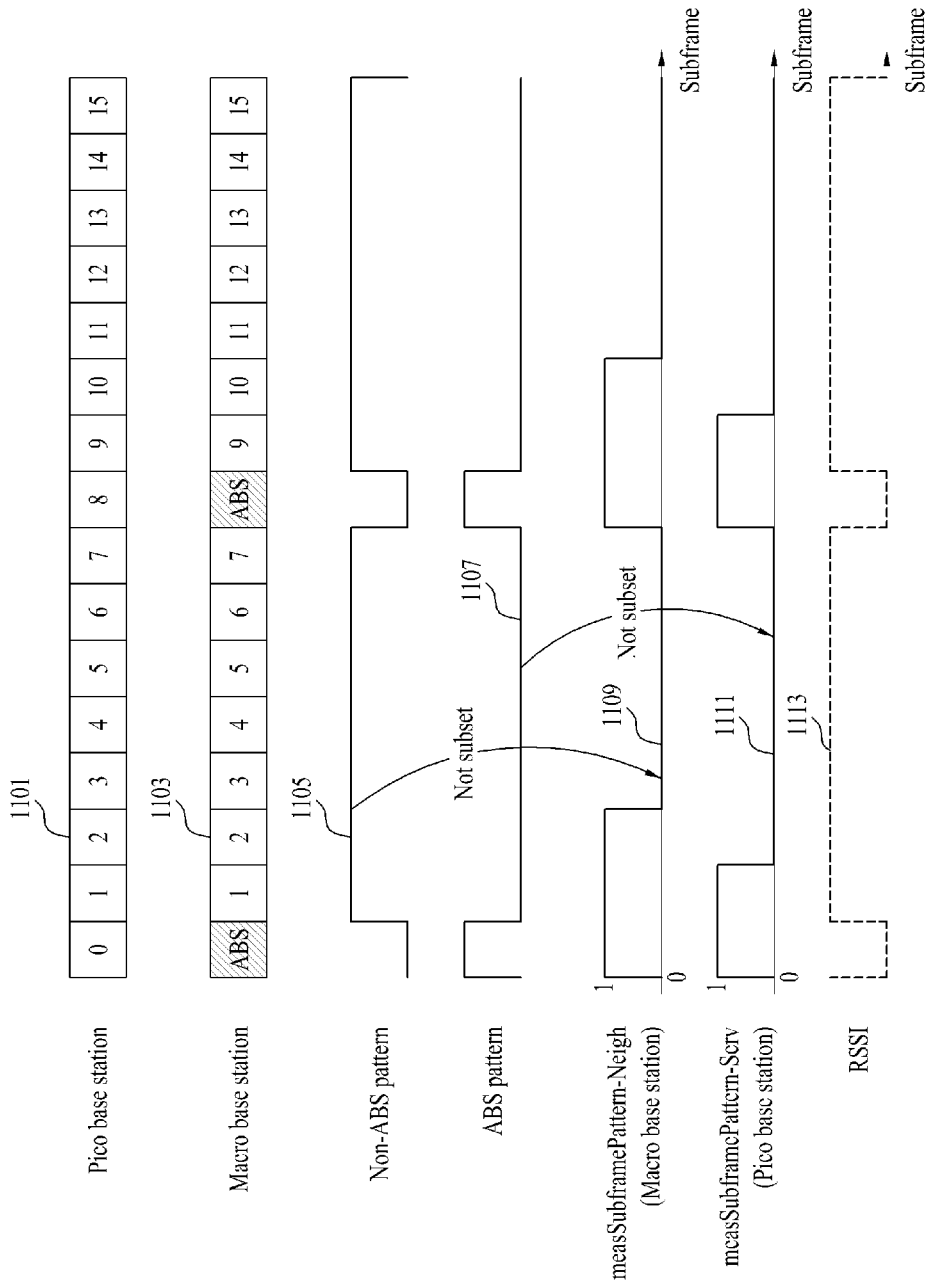
FIG. 11 is a diagram for one example of a cell measuring method according to one embodiment of the present invention.

FIG. 11 is a diagram for one example of a cell measuring method according to one embodiment of the present invention.

When a macro base station operates in ABS, FIG. 11 shows one example of a pattern for RSRP/RSRQ measurements on a serving cell and a neighbor cell if a pico base station and the macro base station correspond to a serving cell and a target (neighbor) cell, respectively. In FIG. 11, a case that a single target (neighbor) cell exists is illustrated. Yet, the same principle is applicable to a case of a plurality of target (neighbor) cells.

Referring to FIG. 11, as ABS is applied to subframes 1103 of a macro base station, $0^{th}$ and $8^{th}$ subframes correspond to ABS subframes. Hence, a non-ABS pattern 1105 of the macro base station and an ABS pattern 1107 of the macro base station are determined.

As mentioned in the foregoing description, since a network provides a pattern for measuring RSRP/RSRQ to a user equipment without considering ABS subframe of a macro base station, a neighbor cell (macro cell) measurement pattern (measSubframePattern-Neigh) 1109 is not included in the non-ABS pattern 1105 of the macro base station [Not Subset]. Moreover, a serving cell (pico cell) measurement pattern (measSubframePattern-Serv) 1111 is not included in the ABS pattern 1107 of the macro base station [Not Subset]. Moreover, looking into RSSI values 1113, an RSSI value in each of subframe #0 and subframe #8 becomes smaller than an RSSI value measured in other subframes due to the ABS operation of the macro base station.

In case that the neighbor cell (macro cell) measurement pattern (measSubframePattern-Neigh) 1109 includes ABS subframe, the user equipment can find the ABS subframe from the neighbor cell (macro cell) measurement pattern (measSubframePattern-Neigh) 1109 using the RSSI value measured in each subframe according to the neighbor cell (macro cell) measurement pattern (measSubframePattern-Neigh) 1109. In particular, the user equipment can find the ABS subframes by determining the subframes (e.g., subframe #0 and subframe #8) having a small RSSI value among the subframes (i.e., subframe #0, subframe #1, subframe #2, subframe #8, subframe #9 and subframe #10) included in the neighbor cell (macro cell) measurement pattern (measSubframePattern-Neigh) 1109 as the ABS subframes. In this case, the user equipment can compare the RSSI values in the contiguous subframes (i.e., subframes #0 to #2, subframes #8 to #10) included in a single pattern. Having found the ABS subframes, the user equipment measures RSRP/RSRQ in the subframes except the ABS subframes for the neighbor cell (macro cell).

Thus, the user equipment measures the RSRP/RSRQ of the macro base station in the subframes except the ABS subframes, thereby performing a cell selection and a RSRQ measurement more accurately.

Moreover, if the serving cell (pico cell) measurement pattern (measSubframePattern-Serv) 1111 includes non-ABS subframe, the user equipment can find the ABS subframe from the serving cell (pico cell) measurement pattern (measSubframePattern-Serv) 1111 using the RSSI value measured in each subframe according to the serving cell (pico cell) measurement pattern (measSubframePattern-Serv) 1111. In particular, the user equipment can find the ABS subframes by determining the subframes (e.g., subframe #0 and subframe #8) having a small RSSI value among the subframes (i.e., subframe #0, subframe #1, subframe #8 and subframe #9) included in the serving cell (pico cell) measurement pattern (measSubframePattern-Serv) 1111. In this case, the user equipment can compare the RSSI values in the contiguous subframes (i.e., subframes #0 and #1, subframes #8 and #9) included in a single pattern. Having found the ABS subframes, the user equipment measures RSRP/RSRQ in the ABS subframes only for the serving cell (pico cell).

Thus, the user equipment measures the RSRP/RSRQ of the pico base station in the ABS subframes only, thereby performing a cell selection more accurately.

4. The General of Device for Implementing the Present Invention

Figure 12:
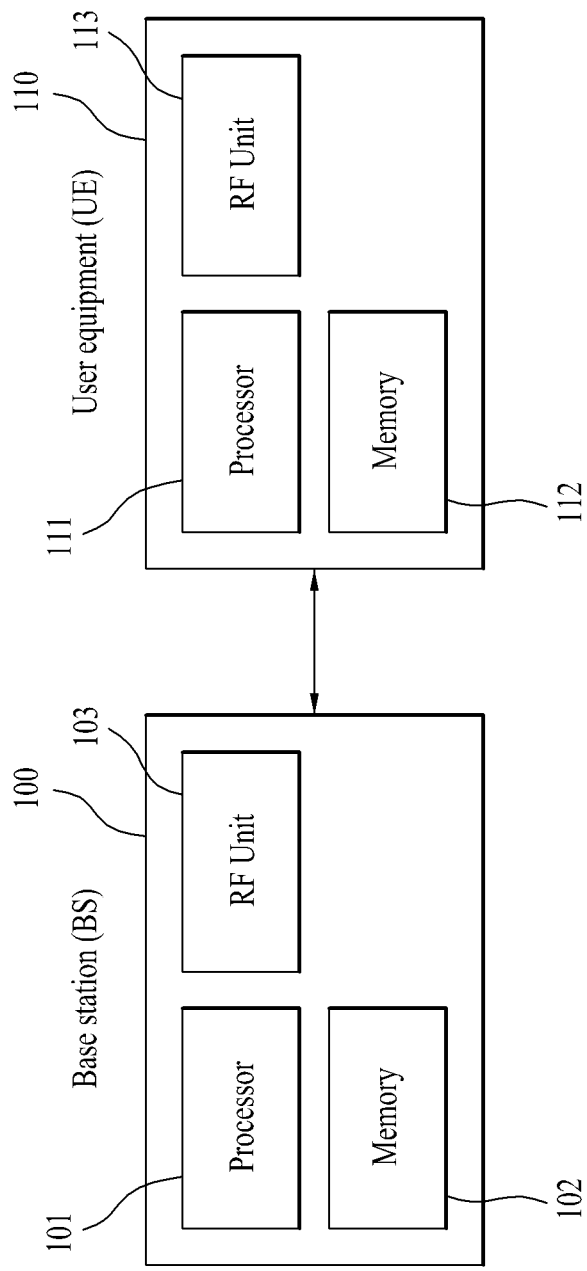
FIG. 12 is a block diagram for a configuration of a wireless communication device according to one embodiment of the present invention.

FIG. 12 is a block diagram for a configuration of a wireless communication device according to one embodiment of the present invention.

Referring to FIG. 12, a wireless communication system may include a base station BS 120 and a plurality of user equipments UEs 130 located within an area of the base station 120.

The base station 120 may include a processor 121, a memory 122 and an RF (radio frequency) unit 123. The processor 121 implements the proposed functions, processes and/or methods. Layers of a radio interface protocol can be implemented by the processor 121. The memory 122 is connected with the processor 121 and then stores various kinds of information to drive the processor 121. The RF unit 123 is connected with the processor 121 and then transmits and/or receives radio signals.

The user equipment 130 includes a processor 131, a memory 132 and an RF unit 133. The processor 131 implements the proposed functions, processes and/or methods. Layers of a radio interface protocol can be implemented by the processor 131. The memory 132 is connected with the processor 131 and then stores various kinds of information to drive the processor 131. The RF unit 133 is connected with the processor 131 and then transmits and/or receives radio signals.

The memory 122/132 may be provided within or outside the processor 121/131. And, the memory 122/132 may be connected with the processor 121/131 via various kinds of well-known means. Moreover, the base station 120 and/or the user equipment 130 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method proposed by the present invention is described with reference to examples applied to 3GPP LTE system, it may be applicable to various kinds of wireless access systems as well as the 3GPP LTE system.

What is claimed is:

1. A method of performing a measurement for a cell in a wireless access system, the method comprising:
    receiving a first pattern for reference signal received power/reference signal received quality (RSRP/RSRQ) measurements for a serving cell and a second pattern for an RSRP/RSRQ measurement for a neighboring cell;
    measuring a received signal strength indicator (RSSI) in a first plurality of subframes included in the first pattern;
    extracting an almost blank subframe (ABS) from the first plurality of the subframes by comparing the measured RSSI and a specific value; and
    measuring the RSRP/RSRQ in the first plurality of the subframes except in the ABS extracted from the first plurality of subframes.

2. The method of claim 1, wherein the serving cell includes a macro cell, and the neighboring cell includes a pico cell.

3. The method of claim 1, further comprising:
    measuring an RSSI in a second plurality of subframes included in the second pattern;
    extracting an ABS from the second plurality of subframes by comparing the RSSI measured in the second plurality of subframes and the specific value; and
    measuring the RSRP/RSRQ only in the ABS extracted from the second plurality of subframes.

4. The method of claim 1, wherein the extracting ABS includes extracting at least one subframe having a measured RSSI value smaller than that measured in a rest of the subframes from the first plurality of the subframes for the RSRP/RSRQ measurements as the ABS.

5. The method of claim 1, wherein the extracting ABS includes extracting at least one subframe having a measured RSSI value smaller than a preset threshold from the first plurality of the subframes for the RSRP/RSRQ measurements as the ABS.

6. The method of claim 1, wherein the extracting ABS includes extracting at least one subframe having a measured RSSI value smaller than an average value of RSSI values measured in the first plurality of the subframes for the RSRP/RSRQ measurements as the ABS.

7. The method of claim 1, wherein pattern information for the RSRP/RSRQ measurements comprises either measSubframePattern-Serv or measSubframePattern-Neigh.

8. The method of claim 1, wherein pattern information for the RSRP/RSRQ measurements is sent through an RRC connection reconfiguration message.

9. A user equipment, which performs a measurement for a cell in a wireless access system, the user equipment comprising:
  a transmitter and receiver configured to transceive radio signals; and
  a processor configured to:
    receive a first pattern for reference signal received power/reference signal received quality (RSRP/RSRQ) measurements for a serving cell and a second pattern for an RSRP/RSRQ measurement for a neighboring cell,
    measure a received signal strength indicator (RSSI) in a first plurality of subframes included in the first pattern,
    extract an almost blank subframe (ABS) from the first plurality of the subframes by comparing the measured RSSI and a specific value, and
    measure the RSRP/RSRQ in the first plurality of the subframes except in the ABS extracted from the first plurality of subframes.

10. The user equipment of claim 9, wherein the serving cell includes a macro cell, and the neighboring cell includes a pico cell.

11. The user equipment of claim 9, wherein the processor is further configured to:
  measure an RSSI in a second plurality of subframes included in the second pattern,
  extract an ABS from the second plurality of subframes by comparing the RSSI measured in the second plurality of subframes and the specific value, and
  measure the RSRP/RSRQ only in the ABS extracted from the second plurality of subframes.

12. The user equipment of claim 9, wherein at least one subframe having a measured RSSI value smaller than that measured in a rest of the subframes from the first plurality of the subframes for the RSRP/RSRQ measurements is extracted as the ABS.

13. The user equipment of claim 9, wherein at least one subframe having a measured RSSI value smaller than a preset threshold is extracted as the ABS from the first plurality of the subframes for the RSRP/RSRQ measurements.

14. The user equipment of claim 9, wherein at least one subframe having a measured RSSI value smaller than an average value of RSSI values measured in the first plurality of the subframes for the RSRP/RSRQ measurements is extracted as the ABS.

15. The user equipment of claim 9, wherein pattern information for the RSRP/RSRQ measurements comprises either measSubframePattern-Serv or measSubframePattern-Neigh.

16. The user equipment of claim 9, wherein pattern information for the RSRP/RSRQ measurements is sent through an RRC connection reconfiguration message.

* * * * *